United States Patent Office 3,825,518
Patented July 23, 1974

3,825,518
DENTAL FILLING MATERIALS
John Foster, Sheerness, and Richard John Walker, Harpenden, England, assignors to The Amalgamated Dental Company Limited, London, England
No Drawing. Filed Mar. 14, 1973, Ser. No. 341,106
Claims priority, application Great Britain, Mar. 15, 1972, 12,134/72
Int. Cl. A61k 5/00; C08f 45/04
U.S. Cl. 260—42.52
6 Claims

ABSTRACT OF THE DISCLOSURE

A composite dental filling material comprises a mixture of a finely divided, inert inorganic filler and the reaction product of an organic diisocyanate, preferably an aliphatic diisocyanate, and a hydroxyalkyl acrylate or methacrylate. The filling material may also contain one or more other ethylenically unsaturated monomer especially polyunsaturated cross-linking monomers. Further the filling material may also contain a catalyst and an activator and the invention also provides a two-part package for the preparation of such a material comprising two parts which together, contain monomer (namely the reaction product of the organic diisocyanate and the hydroxyalkyl acrylate or methacrylate, optionally together with other ethylenically unsaturated monomers), inert filler, catalyst and activator; neither of the parts of the package containing both catalyst and activator.

---

This invention is concerned with improvements and relating to tooth filling or stopping compositions. More particularly, the present invention relates to composite tooth filling or stopping materials comprising a mixture of a polymerizable organic component and an inert finely divided, inorganic filler component.

It has now been found, in accordance with the present invention, that the polymerizable material prepared by reacting an organic diisocyanate with an at least stoichiometrically equivalent amount of hydroxyalkyl acrylate is particularly suitable for use as polymerizable component in a composite dental filling material.

Broadly, therefore, the invention consists in a composite dental filling material comprising a mixture of a finely divided, inert inorganic filler and the reaction product of an organic diisocyanate and a hydroxyalkyl acrylate or methacrylate. The inert filler preferably forms the major proportion by weight of the dental filling material, suitably from 70 to 80% by weight thereof, and preferably has a particle size of from 5 to 60 microns. Examples of suitable inert filler materials which may be used include silane coated glasses, aluminium oxide, quartz and silica.

The reaction product of the organic diisocyanate and the hydroxyalkyl acrylate (herein referred to as the "urethane diacrylate") is prepared by reacting at least two moles of the hydroxyalkyl acrylate per mole of organic diisocyanate. The urethane diacrylate may be represented by the formula formula:

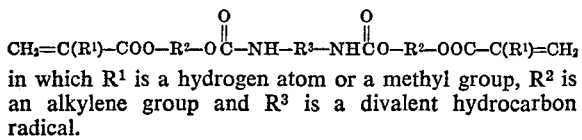

in which $R^1$ is a hydrogen atom or a methyl group, $R^2$ is an alkylene group and $R^3$ is a divalent hydrocarbon radical.

The organic diisocyanate used in the preparation of the urethane diacrylate may be an aromatic diisocyanate but is, preferably, an aliphatic diisocyanate, such as, for example, 2,3,4-trimethyl hexamethylene diisocyanate. The hydroxyalkyl acrylate is preferably one containing from 2 to 10 carbon atoms in the alkyl group (i.e. $R^2$ in the above formula contains from 2 to 10 carbon atoms) and may be, for example, hydroxypropyl methacrylate. The polymers prepared by polymerizing the urethane diacrylates have the advantage of being water white and this may be aesthetically useful in particular applications of the composition.

The dental filling composition in accordance with the invention may also contain other ethylenically unsaturated monomers, particularly polyunsaturated cross-linking monomers, especially the diacrylates or dimethacrylates of dihydric alcohols, such as, for example, ethylene glycol dimethacrylate.

The filling composition as filled into a cavity in a tooth will also contain a catalyst, e.g. a free radical catalyst such as benzoyl peroxide and, desirably, also a polymerization activiator, e.g. an amine type activator such as dimethyl-para-toluidine or para-tolyl-diethanolamine.

Clearly, the composition as sold cannot comprise the monomer together with activator and catalyst and hence will generally be sold as a two part composition no part of which contains both activator and catalyst. Clearly, it is possible to formulate many variations of two part packages but the essential features of the two part package will be that together the two parckages will contain monomer (by which term is meant urethane diacrylate optionally with other ethylenically unsaturated polymerizable monomers), filler, catalyst and activator; neither of the parts of the package containing both catalyst and activator. Examples of such compositions are:

| PART A | PART B |
| --- | --- |
| Monomer | Catalyst alone; or |
| Filler | Catalyst and filler; or |
| Activator | Catalyst and monomer. |

Another form of composition in accordance with the invention is one comprising a first component containing monomer and activator and a second component comprising filler and catalyst.

In order that the invention may be well understood the following Example is given by way of illustration only.

Example (a) A 2 litre reaction vessel is fitted with a glass stirrer and stirrer gland connected to a variable speed motor via the central neck. A condenser fitted with a drying tube, a nitrogen inlet tube, a dropping funnel and a thermometer are fitted in the remaining necks. 606.0 gms. of hydroxypropyl methacrylate are weighed out and added to the reaction vessel. 10.48 gms. dibutyl tin dilaurate are weighed out and added to the reaction vessel. Stirring is commenced, nitrogen is pasesd through the apparatus and the vessel is cooled in an ice bath to about 5° C. 441.6 gms. of 2,3,4 trimethyl hexmethylene diisocyanate are weighed out and added to the dropping funnel. The diisocyanate is added over 1 hour not allowing the temperature of the reactants to rise above 25° C. The reactants are stirred for a period of one hour following the complete addition of the diisocyanate.

(b) A paste is prepared by compounding the following ingredients in the proportions indicated in a suitable mixer.

| | Percent |
| --- | --- |
| Diurethane dimethacrylate | 15.70 |
| Triethylene glycol dimethacrylate | 4.50 |
| p-Tolyl diethanolamine | 0.330 |
| Uvistat 247 | 0.225 |
| Butylated hydroxy toluene | 0.014 |
| Di-tert. butyl sulphide | 0.009 |
| Silane coated inorganic filler | 80.00 |

Since the diurethane dimethacrylate monomer is a very viscous liquid, triethylene glycol dimethacrylate is added to thin it down to a workable consistency. p-Tolyl diethanolamine is added as an activator for polymerisation and Uvistat 247 as an ultraviolet stabiliser. Butylated hydroxytoluene is added as an antioxidant and di-tert butyl sulphide as a polymerisation inhibitor. The inorganic filler can be for example crystalline quartz, glass, silica or aluminium oxide having a particle of approximately 60μ. The filler is coated with 0.5% of a silane coupling agent such as γ-methacryl-oxypropyl-trimethoxy-silane by using the following technique. The silane is dissolved in a 30/70 water acetone mixture and the resultant liquid is mixed with the filler to obtain a slurry. The acetone and water are then removed from the slurry at 100° C. and finally the silane is condensed onto the surface of the filler by heat treatment, at 125° C. for 2 hours. The coated filler is then sieved through a 60μ silk.

(c) A portion of the paste equivalent to a filling may be polymerised by the addition of a drop of a 5% solution of benzoyl peroxide in, for example, triethylene glycol dimethacrylate. Alternatively the composition can be divided into liquid and powder components such that the powder consists of filler and peroxide and the liquid consists of the remaining ingredients. This latter presentation is particularly useful for encapsulated mixes using a high speed vibrator. The paste/liquid or powder/liquid systems are hand mixed by blending with a spatula for thirty seconds. The mixed material will have a working time at 21° C. of approximately 4 minutes and a set time at mouth temperature of 3 minutes. After 24 hours water immersion the set material will have a compressive strength of 2500 kgm./cm.$^2$, a modulus of rupture of 110N/mm.$^2$, a solubility of 0.08% and a water absorption of 0.17%. The Wallace hardness is 150 and the coefficient of thermal expansion is $33 \times 10^{-6}$ over the temperature range 22°–52° C.

We claim:

1. A composite dental filling material comprising a mixture of from 70 to 80 percent by weight of a finely divided, inert inorganic filler and from 30 to 20 percent by weight of the reaction product of an organic aliphatic diisocyanate and the hydroxyalkyl acrylate or methacrylate having the formula:

$$CH_2=C(R^1)-COO-R^2-O\overset{O}{\overset{\|}{C}}-NH-R^3-NH\overset{O}{\overset{\|}{C}}O-R^2-OOC-C(R^1)=CH_2$$

wherein $R^1$ is a hydrogen atom or a methyl group, $R^2$ is an alkylene group, and $R^3$ is a divalent aliphatic hydrocarbon radical.

2. A filling material according to claim 1 in which the inorganic filler has a particle size of from 5 to 60 microns.

3. A filling material according to claim 1 in which $R^2$ contains from 2 to 10 carbon atoms.

4. A filling material according to claim 1 also containing one or more other ethylenically unsaturated monomers.

5. A filling material according to claim 4 in which the other ethylenically unsaturated monomer is a polyunsaturated cross-linking monomer.

6. A filling material as claimed in claim 1 also containing a catalyst and an activator.

References Cited
UNITED STATES PATENTS

| | | | |
|---|---|---|---|
| 3,629,187 | 12/1971 | Waller | 32—15 |
| 3,297,745 | 1/1967 | Fekete et al. | 260—471 C |
| 3,553,174 | 1/1971 | Hausslein et al. | 260—77.5 CR |

ALLAN LIEBERMAN, Primary Examiner

H. H. FLETCHER, Assistant Examiner

U.S. Cl. X.R.

32—15; 106—35; 260—998.11, 77.5 CR, 77.5 MA, 482 B, DIG 36, 42.53